United States Patent [19]

Dean

[11] 4,185,970

[45] * Jan. 29, 1980

[54] PAINT SPRAY BOOTH COMPOSITION

[76] Inventor: Ralph R. Dean, P.O. Box 1492, Fort Worth, Tex. 76117

[ * ] Notice: The portion of the term of this patent subsequent to Nov. 14, 1995, has been disclaimed.

[21] Appl. No.: 908,577

[22] Filed: May 22, 1978

Related U.S. Application Data

[63] Continuation of Ser. No. 776,116, Mar. 10, 1977, Pat. No. 4,125,476.

[51] Int. Cl.$^2$ .............. B01D 47/00; B08B 3/08; C09D 9/00; C23D 17/00
[52] U.S. Cl. .................................. 55/89; 55/84; 134/38; 252/111; 252/174.23; 252/135; 252/140; 252/174.17; 252/156; 252/160; 252/174.25; 252/527; 252/546; 427/331; 427/345
[58] Field of Search ............ 134/38; 252/89, 111, 252/112, 113, 114, 115, 135, 139, 140, 155, 156, 158, 159, 160, 173, DIG. 8, DIG. 11, 527, 546; 427/331, 345, 352, 353; 98/115 SB; 55/84, 89

[56] References Cited

U.S. PATENT DOCUMENTS

| | | | |
|---|---|---|---|
| 2,315,125 | 3/1943 | Meckler | 106/287 |
| 2,362,964 | 11/1944 | Affleck | 134/38 X |
| 2,447,052 | 8/1948 | Bond | 252/160 |
| 2,739,903 | 3/1956 | Arnold | 252/135 X |
| 2,982,723 | 5/1961 | Arnold | 252/139 X |
| 3,553,144 | 1/1971 | Murphy | 252/158 |
| 3,985,922 | 10/1976 | Thornton | 427/345 |

OTHER PUBLICATIONS

Bennett, H.; *The Chemical Formulary*, vol. XVI, published by Chemical Publishing Co, Inc., New York, 1971, pp. 76–77.

*Primary Examiner*—Dennis L. Albrecht
*Attorney, Agent, or Firm*—Wofford, Fails & Zobal

[57] ABSTRACT

A composition for trapping and removing paint from a paint spray booth characterized by an aqueous solution-suspension containing at least 4 percent by weight of a water softener, a concentration within the range of 4–25 percent by weight of a colloid that will pick up moisture and swell and remain stable in highly alkaline solutions: a concentration within the range of 1–8 percent by weight of a surfactant; and a concentration within the range of 5–50 percent by weight of an alkaline material that is either an alkali metal hydroxyide or an alkali metal metasilicate. The composition preferably also includes a concentration within the range of 0.1–3 percent by volume of a defoamer. Specific and critical examples of the respective water softener, colloid, surfactant and defoamer are disclosed, as is the optimum concentration of the ingredients. Also disclosed are improved embodiments having additional additives incorporated thereinto for specific purposes with specific types of paints.

8 Claims, No Drawings

PAINT SPRAY BOOTH COMPOSITION

This is a continuation of application Ser. No. 776,116, filed Mar. 10, 1977, now U.S. Pat. No. 4,125,476.

BACKGROUND OF THE INVENTION

1. Field of the Invention

This invention relates to the class of compositions known as "paint spray booth compositions". More particularly, the invention relates to a composition for circulating in a system for trapping and removing paint from a paint spray booth.

2. Description of the Prior Art

The prior art has seen a wide variety of apparatus, methods and compositions for attempting to solve the problem of removing paint from paint spray booths and the like. These attempts have included the following. Electrostatic precipitators in a moving air stream have been employed to try to effect a removal of the droplets of the dried paint. These have not been totally successful because of the inadequate drying of the paint, the agglomeration, and the resulting mess. The use of background boards has been tried to allow paint build up thereon. This has not been successful when attempting to spray bulky objects or the like. In the recent past there has been developed the use of vertically oriented surfaces that are wet by a fluid flowing thereover, the fluid serving to entrap the paint droplets to remove them from the paint spray booth. These types of apparatuses have usually been of two general types. In one the pump sucks in the fluid and circulates and sprays it in a curtain, over a waterfall, or the like without conditioning. In this kind of apparatus, the droplets of paint plug the spray nozzles, foul the pump and otherwise render costly repairs necessary repeatedly. In the pumpless type, the supernatant liquid is sucked from over a sludge and flowed over vertical surfaces to form a film of the composition. The sludge has become semi-solid, bonded to the storage container or failed to settle and fouled the circulation means. Clean up became troublesome. A wide variety of hydrophilic and hydrophobic compositions have been tried but have not been successful in resolving the problem. Moreover, these compositions have required daily metering of new composition into the system with costly removal of the sludge, as by filtration, or large quiescent storage vats or the like on a daily basis. Thus, inordinate amounts of time have to be spent treating the composition and the system.

From the foregoing it can be seen that the prior art has not found a satisfactory solution to the problem of removing paint from a paint spray booth; particularly, employing a composition for trapping and removing the paint.

SUMMARY OF THE INVENTION

Accordingly, it is an object of this invention to provide an economical composition for trapping and removing paint from a paint spray booth that obviates the disadvantages of the prior art and is formulated to perform several functions simultaneously, including encapsulation, dispersion, precipitation, degradation and the like on a wide variety of coating materials, or "paints", including lacquers, varnishes and the like; yet be employed in an aqueous medium.

It is a further object of this invenion to provide one or more aqueous based solutions or solution-suspensions that can be circulated in a system to remove a wide variety of vehicles, pigments, solvents and the like, water-based or oil-based and containing inorganic or organic colorants; form a protective film around the droplets of the paint, provide a physical barrier between the particles and aid in preventing coagulation and other undesired reactions; and accomplish the objective delineated above without requiring daily or short term treatment of the composition.

These and other objects will be understood more nearly completely from the descriptive matter hereinafter.

In accordance with this invention, there is provided a basic composition for trapping and removing paint from a paint spray booth compound comprising an aqueous solution-suspension containing at least 4 percent by weight of a water softener; a concentration within the range of 4–25 percent by weight of a colloid that will pick up moisture and swell, and remain stable in highly alkaline solutions; a concentration within the range of 1–8 percent by weight of a surfactant; and a concentration within the range of 5–50 percent by weight of an alkaline material that is either an alkali metal hydroxide or an alkali metal metasilicate. To remove a wider variety of paints, the composition preferably includes a concentration within the range of 0.1–3 percent by weight of a defoamer. The respective ingredients will be delineated more nearly completely hereinafter, as will their concentration ranges, including the optimum concentrations.

In another embodiment of this invention, there is added to the basic composition a solubilizing, emulsifying and dispersing composition in a concentration within the range of 25–75 percent by weight of the total composition. The solubilizing, emulsifying and dispersing composition is delineated completely in the descriptive matter under preferred embodiments.

In still another embodiment of the invention, there are added to the basic composition ingredients to form a paint flotation composition. The paint flotation composition includes 5–25 percent by weight of pine oil and 5–25 percent by weight of aromatic solvent.

In still another embodiment of this invention, there is added to the basic composition other ingredients to convert it to a composition for emulsifying and coupling paint formulations. The composition for emulsifying and coupling paint formulation includes 5–25 percent by weight of 2-butoxyethanol and 5–25 percent by weight cresylic acid.

DESCRIPTION OF PREFERRED EMBODIMENTS

There are many types of coating materials, or "paints", including lacquers, varnishes and the like, that are employed in paint spray booths. Moreover, there are many creations within each generic type. Accordingly, there is a severe burden on any composition that is to be used to remove, disperse and/or deactivate such coating materials. Ordinarily, it is preferable to employ an aqueous media to disperse and/or deactivate the materials for removal from the paint spray booth. Yet, in order for the composition in aqueous media to work, several functions must be performed simultaneously. The individual droplets, or globules, of the coating material must be encapsulated, dispersed, precipitated, degraded or otherwise prevented from re-agglomeration. Moreover, the material must remain in its disparate state over a protracted interval if the objectionable daily treating or the like is to be avoided.

Specifically, these coating materials usually consist of the vehicle, the pigment and the solvent. They may be water-based, oil-based, or other types. They ordinarily contain inorganic or organic colorants and miscellaneous materials for ease in application. The initial function of any composition of additive in a water solution at the proper concentration is to engage the particles of coating material, or "paint", as they are projected into a spray or film of the composition; thereby forming a protective physical barrier between the particles. I have discovered that forming a colloidal film around the particles provides the physical barrier that aids in preventing coagulation and other undesired reactions while at the same time permitting the various other components of my composition to attack the different parts of the coating material and accomplish the other functions that must be done.

In essence, the aqueous solution-suspension, or colloidal type, spray booth composition of this invention serves as a synergized physical and chemical systems that has proven surprisingly effective. Under ideal conditions, a proper charge of the compound can function for from one to three months without additions, eliminating the daily treating that is so objectionable and time consuming. Most competitive products require the daily treating of, or daily metering of additions to, the system. With a system of this invention, after the long period of use, the "sludge" can be pumped or flowed from the system followed by a water rinse and recharge. The sludge contains valuable components, particularly with certain types of paint, and may be reworked for recovering the valuable components thereof. Moreover, the composition of this invention has been approved for discharge to sewage systems, since the normally interfering constituents have been deactivated by the composition of this invention.

As indicated hereinbefore, and as will be described in complete detail hereinafter, the composition of this invention is circulated such that a film of it will pick up the excess coating material and disperse it in the composition. Everything, then, can be removed after a long time interval. The objectionable paint spray or the like is, however, immediately removed from the atmosphere in the paint spray booth and put into a non-interfering sludge in the composition of this invention. The composition of this invention has been delineated hereinbefore and the following descriptive matter will clarify and give a more nearly complete description of the individual consituents of the composition; such as, the water softener, the colloid, the surfactant, the alkaline material and the defoamer.

The water softener must be stable at a high alkalinity; for example, in the range of a pH of 12–13. It should keep iron sequestered and in suspension at the high alkalinity. Any water softener that is stable and that will do this can be employed in this invention. Of the several commercially available water softeners, the following three have been found satisfactory. Sodium tripolyphosphate can be employed. The sodium salt of ethylenediaminetetraacetic acid (EDTA, sodium salt) is also a very good water softener for the composition of this invention. As is well known, it is sold commercially under the trade name Versene. The neutralized gluco heptonate salts have been found particularly effective for the water softener in this invention. The ammonium salt of any of the softeners is not as desirable as the alkali metal salts, since it tends to give off ammonia odor with time. The most preferable are the alkali metal salts; such as the cesium, lithium, potassium, or sodium cations. Of these, the sodium salt is the most economical and is most widely useful. As is well known, sodium gluco heptonate is commercially available and is described explicity in U.S. Pat. No. 3,022,343 and implicitly in others.

The water softener removes or controls the calcium and magnesium ions, as well as other troublesome ions. It aids in flushing out the sludge and other debris. It also renders the composition of this invention more pumpable and a less viscous fluid. While the specific function is discussed later hereinafter with respect to concentrations, it is sufficient at this point to note that it modifies the tough gel formed when first admixed with the colloid.

The colloid must be adsorbent so as to pick up moisture and swell and remain stable in highly alkaline environments. By highly alkaline is meant pH's at least above 10 and preferably in the range of 12–13. Several colloids can be employed in the invention. These include glue, starch, Kiesulguhr, dextrin, and casein. The colloid that has been demonstrated superior, however, is bentonite clay. Because of its economy and its superiority, the bentonite clay is the most preferred colloid. The colloid must remain in a suspension in the aqueous solution to form a coating around the paint particles and prevent their agglomeration after they are dispersed in the composition of this invention. The colloid tends to make a highly viscous suspension but cooperates with the water softener and the surfactant to obtain the desired dispersion and reduce the danger of flocculation and agglomeration.

The surfactant that is employed must be stable in highly alkaline environments. While any of the three surfactants can be employed, the cationic surfactants tend to react with the bentonite to get a bentone. Consequently, they are less desirable. When the cationic surfactant is employed, care must be exercised to prevent flocculating the clays. The cationic type surfactants may be used, however, for exotic types of paint where the cationic character is beneficial. Typical of the cationic surfactants is the cetyl pyridinium chloride. The anionic surfactants may be employed and include materials such as sodium stearate, sodium laurate, sodium petroleum sulfonate solutions. The sodium petroleum sulfonate solutions are particularly efficacious if employed with minor amounts of sodium chloride to effect low interfacial tension between the hydrophilic and hydrophobic constituents in the composition containing the paint sludge. The most preferred form of surfactant for this invention is the nonionic surfactant. These nonionic surfactants include the nonyl phenol with 8 to 100 mols of ethylene oxide average per mol of nonyl phenol, the octyl phenol with 8 to 100 mols of ethylene oxide per mol of octyl phenol. Particularly preferable is the sodium lignosulfonate surfactant available from Marathon Chemical Company. This lignosulfonate has a reduced $SO_3$ content.

The surfactant is added to reduce the interfacial tension and is employed to increase the sequestration of the iron that is frequently a component of pigments for the paints. Moreover, the surfactant should be a low foaming surfactant for obtaining less foaming of the composition of this invention as it is circulated. The nonionic surfactants, including the sodium lignosulfonate, have these desirable properties. These surfactants are also stable with the alkaline material.

The alkaline material for use in the composition of this invention includes the alkali metal metasilicate and the alkali metal hydroxides. The ammonium hydroxide is objectionable, although is can be employed; because of the odor that is given off with time. The alkaline material must be satisfactory to saponify the older type paint ingredients, such as linseed oil. It must supply a highly alkaline environment; preferably a pH in the range of 12–13; for beneficially controlling the characteristics of the epoxy type paints, or the glycolates. It must help tie up the metallic ions, such as iron cation, calcium cation, magnesium cation, manganese cation, and copper cation while disintegrating the paint molecules otherwise. The type of alkaline material will depend to some extent on the type of paint being employed. The sodium metasilicate is a good corrosion inhibitor for metal and is, hence, ordinarily preferable over the alkali metal hydroxides.

With some paints, the foregoing composition is adequate. With others, however, a defoamer is desired to prevent excessive foaming. Consequently, I have found it preferable to market a composition that has the defoamer in it to take care of any contingency. Any of the conventionally available defoamers may be employed. These include the silicones, such as are commercially available from Dow-Corning, General Electric, and others. Other defoamers such as dioctyl phosphate and 2,ethylhexanol can be employed. The defoamers must be stable in a highly alkaline environment, as well as in the presence of the paint components.

The concentrations of the respective ingredients may vary depending upon the paint. Ordinarily, it is possible to delineate the minimum and maximum amounts of the additive within practical considerations. Also, there will be discussed an optimum concentration of the constituent.

The following descriptive matter is given primarily in terms of a theoretical percent by weight, based on 100 percent active ingredients. If less concentrated ingredients are employed, the amounts delineated hereinafter should be adjusted upwardly to compensate therefor. It is to be realized that, as a practical matter, the local treatment may be effected by adding so many pounds of an admixture to a ten gallon container or to a fifty-five gallon container, and the remainder being supplied with tap water or the like. The weight basis may range from only slightly more than the about eighty-five pounds per ten gallons of aqueous solution to as much as one hundred and twenty pounds per ten gallons for a preferable form of this composition.

The water softener is included in an amount of at least five pounds per ten gallons of the aqueous solution-suspension. This is equivalent to a concentration of at least 4 percent by weight. A higher concentration improves the dispersant and other properties of the composition but increases the cost and decreases the solubility of the aqueous solution-suspension. From an economic point of view, about seven pounds per ten gallons of total composition is about the optimum. This is equivalent to about 6 percent by weight.

Frequently the water softener will be purchased in liquid form containing only 50 percent of the active water softener. When this is the case, the amount of the liquid that is added is twice the indicated weight of pure water softener. Commensurate adjustments are made for different concentrations in the available form of surfactant employed, of course.

If less than about five pounds per ten gallons is employed, particularly in hard water, there is a less of efficiency and effectiveness that is too great to be tolerable in long term batch treatment and effective paint removal. When more than five pounds; for example, more than four and about six percent by weight; is employed, the tough bentonite gel that is formed when the colloid is bentonite clay is rendered fluid and pumpable. In fact there is induced a shear thinning property such that once the fluid is circulating, the solution becomes quite thin and pumpable with low friction losses. Yet, when allowed to come to rest, the composition becomes viscous to help prevent agglomeration of the paint particles, particularly when coated with the colloid.

The colloid is employed in a concentration within the range of 4–25 percent by weight. Specifically, this translates into an amount of at least five pounds per ten gallons of total composition and no more than thirty pounds per ten gallons of total composition. The optimum concentration is about twenty pounds per ten gallons of composition, or about 17 percent by weight. With this concentration there is enough colloid to surround and isolate the individual particles of paint that are picked up by the composition and prevent reagglomeration. There is sufficient colloid to remain stable in the highly alkaline environment. If less than five pounds per ten gallons, or less than about 4 percent by weight, is employed, the colloid becomes ineffectual and there is agglomeration of the paint particles such that they stick together and plug up spray nozzles, pump inlets, foul vanes and the like. If more than thirty pounds per ten gallons, or about 25 percent by weight, is employed, the solution-suspension becomes too viscous and limits the solubility of other materials in the composition, as well as becoming difficult to pump, and the like.

The surfactants are employed in a concentration within the range of about 1–8 percent by weight based on pure surfactant content. Where a liquid surfactant that is diluted is employed, the proportionally greater amount is added to obtain the desired surface active properties delineated hereinbefore with respect to the concentrated form of the surfactant.

The optimum concentration of the surfactant is about 4.5 pounds per ten gallons of total composition. Expressed otherwise, the optimum concentration will be in the range of about 4.0–5.0 percent by weight.

The alkaline material is employed in a concentration within the range of about 5–50 percent by weight. The amount varies depending to some extent on the type of paint, as indicated hereinbefore. An optimum amount for universal service appears to be 30 percent by weight, based upon experience to date. For example, we are employing about 27–33 pounds per ten gallons of composition.

When the defoamer is employed, as it usually is in our commercial formulations, it is employed in a concentration within the range of 0.1–3.0 percent by volume, since the defoamers are usually liquids. An optimum concentration is about 1 percent by volume.

In operation, the desired concentration of the respective constituents, or ingredients, are admixed together for the volume of formulation; whether it be for a single ten gallon batch, a fifty-five gallon barrel, or a plurality of fifty-five gallon barrels for sale. If desired, of course, the ingredients may be assembled commercially in suitable form for the addition of the water in a prescribed amount. For example, a packet containing the desired ingredients for forming ten gallons of the aqueous solution-suspension can be employed in the desired amount of water to finish the volume. Ordinarily, it is advantageous to admix the ingredients to form a uniform semi-paste that is added to water at the rate of approximately 2½ gallons per 100 gallons of water. On the other hand, we have found that our customers prefer not to have to admix the material. Accordingly, for most of our commercial customers the water is added to the fifty-five gallon drums so that they need only pour it into the particular circulating system that they are employing.

In any event, the desired composition in the amount necessary for the particular system is admixed as described hereinbefore in the desired proportions. The concentration may be increased or decreased based on the particular paints or coating materials that are to be removed. In the final formulation the water softener removes or controls the calcium and other ions as implicitly described hereinbefore to prevent undesired reactions. It also aids in flushing out the sludge and debris. The surfactant and colloid form a synergistic blend in dispersing and encapsulating the paint particles. Also, the surfactant may serve as a solvent for one or more of the paint components. The desired amount is charged into the system and circulated to flow as a film that performs the several functions simultaneously so that the paint particles are removed from the paint spray booth and dispersed, encapsulated, suspended and the like in the aqueous solution-suspension, or composition. In the composition, the paint particles can be retained harmlessly for a one to three month period. Thereafter, it is again necessary to flush out the system and install a fresh composition.

With certain coatings, such as urethanes, epoxies, and other highly organic formulations, other additives may be added to the basic formulation, singly or in combination, to obtain desired end results.

OTHER EMBODIMENTS

For better results in removing these difficultly removable paints, there is also included, in addition to the basic composition delineated hereinbefore, a solubilizing, emulsifying and dispersing composition.

The solubilizing, emulsifying and dispersing composition comprises a second aqueous solution that includes pine oil, aromatic naptha, 2-butoxyethanol, tall oil fatty acid, alkali metal hydroxide, surfactant and a softener.

The pine oil is crude turpentine from distillation of pine wood. As is recognized, it is comprised chiefly of γ-terpinene, cineol, fenchyl alcohol, borneol, and α-terpineol. Pine oil is readily commercially available.

The aromatic naphtha comprises the oils of the parafinic series obtained from the distillation of petroleum, coal tar, or shale oil or the like that also have aromatic molecules therein. As is recognized, the aromatic molecules are benzene derivatives whose molecules contain one or more carbon rings that are unsaturated. The preferred aromatic naphtha for the second aqueous solution is a heavy aromatic naphtha having a boiling point range of from 319° F. to about 528° F. The heavy aromatic naphtha is commercially available under this nomenclature.

The compound 2-butoxyethanol is emplaced to solubilize the hydrophilic and hydrophobic constituents and moieties of the solubilizing, emulsifying and dispersing composition. 2-butoxyethanol is also refered to as glycobutyl ether, and ethylene glycol monobutyl ether, and readily available under the trade name Butyl Cellosolve.

The tall oil fatty acid is a byproduct from sulfate wood pulp digestion, mainly resin acids and fatty acids such as linoleic, abietic acid, linolenic, and some oleic acid, with 2,2'-dihydrostigmasterol and lignoceryl alcohol.

The alkali metal hydroxide is preferably potash, or potassium hydroxide, for more efficiently converting and solubilizing of the tall oil fatty acid to a soluble soap. The sodium hydroxide could be employed. The other alkali metal hydroxide, such as cesium hydroxide and lithium hydroxide, are more expensive and usually less desirable.

The surfactant is preferably a nonionic surfactant or an anionic surfactant, such as delineated hereinbefore.

The softener may be a sodium phosphate, sodium tripolyphosphate, the sodium salt of ethylenediaminetetraacetic acid (EDTA). Ordinarily, the sodium tripolyphosphate is more economical and may be preferred unless an unusual amount of chelating action makes the EDTA preferable even if more expensive.

The solubilizing, emulsifying and dispersing composition is employed in a concentration in the range of 25-75 percent by weight of the total composition, including also the basic composition delineated hereinbefore.

The concentrations of the respective ingredients in the solubilizing, emulsifying and dispersing composition, or the second aqueous solution, are as follows.

The pine oil is employed in a concentration within the range of 1.1-13.9 percent by weight. Expressed otherwise, the pine oil is present in about five pounds to sixty pounds; the optimum being about forty-three pounds; per barrel (55 gallon) of the second aqueous solution. A barrel of the second aqueous solution weighs about 430 pounds. Thus it can be seen that the optimum concentration of the pine oil is about 10 percent by weight.

The aromatic naphtha is employed in a concentration within the range of 42-51 percent by weight. This translates into an amount of from 180 to 220 pounds of the aromatic naphtha per barrel of the second aqueous solution, the optimum being about 200 pounds per barrel, or about 46 percent by weight, of the naphtha.

The 2-butoxyethanol is employed in a concentration within the range of 6.3-7.6 percent by weight, preferably about 7.0 percent by weight. The 2-butoxyethanol must be employed in an amount that tends to create a true solution of the respective hydrophilic and hydrophobic constituents and moieties.

The tall oil fatty acid is employed in the concentration within the range of 13.9-16.2 percent by weight. This translates into an amount of 60-70 pounds of tall oil fatty acid per barrel of the second aqueous solution. The optimum concentration of the tall oil fatty acid is about 66 pounds per barrel of the second aqueous solution, or about 15.3 percent by weight. The tall oil fatty acid is effective in forming an oil soluble soap with the potash to effect degreasing and enable the composition to be circulated even in the presence of the difficultly controllable paints such as the acrylics, alkyds and synthetics.

The alkali metal hydroxide is employed in an amount to saponify the tall oil fatty acid. This requires at least 12 pounds per barrel, or a concentration of about 2.8 percent by weight. Ordinarily, no more than 20 pounds per barrel, or about 4.6 percent by weight will be employed. The optimum concentration of the alkali metal hydroxide is about 3.7 percent by weight, or about 16 pounds per barrel of the second aqueous solution.

The surfactant is employed in a concentration within the range of 2.3–9.3 percent by weight, the optimum being about 7 percent by weight. This translates into at least 10 pounds per barrel and no more than about 40 pounds per barrel. The optimum concentration is about 30 pounds of surfactant per barrel of the second aqueous solution.

The softener is employed in an amount necessary to soften the water and this may range from few parts per million up to as much as 3 percent or so by weight.

In operation, the basic composition is prepared as described hereinbefore. The solubilizing, emulsifying and dispersing composition is added in a concentration in the desired amount; for example in the range of 25–75 percent by weight of the total composition. The total composition, or solution-suspension, is circulated in the system as described hereinbefore with respect to the basic composition. The paint droplets are then removed from the paint spray booth to form a sludge that can continue to be circulated for the prolonged interval of from one to three months such as described hereinbefore, even though the paints are the difficultly controllable types of paints that have been so troublesome in the prior art systems.

Additional materials may be added singly or in combination to improve the system for specific paints. These additives include cresylic acid, pine oil, glycol ethers, tall oil soaps, petroleum sulfonates, aromatic solvents, and coupling agents. Two of such systems that are specifically useful and frequently employed are systems to convert the paint removal composition (1) into a paint flotation composition or (2) into a composition to emulsify and couple the paint formulations.

When the total composition is employed as a paint flotation composition, there is added to the basic composition an amount sufficient to include respective concentrations within the respective ranges of 5–25 percent by weight of pine oil and of 5–25 percent by weight of aromatic solvents.

The pine oil has been described hereinbefore.

The aromatic solvents comprise the benzene derivatives such as benzene, xylol, xylene, and the like. These aromatic solvents are commercially available.

When the composition is used to emulsify and couple the paint formulations, there is included in the final composition an amount sufficient to have a concentration within the range of 5–25 percent by weight of 2-butoxyethanol and 5–25 percent by weight of cresylic acid.

The 2-butoxyethanol has already been described hereinbefore.

The cresylic acid is a mixture of the ortho-, meta- amd para-cresols.

In operation, these respective systems, singly or in combination, are added to the basic composition to provide a final total composition for accomplishing the desired specially delineated functions. The resulting final total composition is then circulated similarly as described hereinbefore such that the water film picks up and removes the droplets of the paint from the paint spray booth. The paint is held in suitable encapsulated, dispersed form in the circulating aqueous composition or in the sludge that has settled to the bottom such that there is no plugging of spray nozzles, no interference with pumping and the like.

The following examples illustrate the best known examples of the specific basic composition and the useful additive systems.

EXAMPLE I

In this example, there is prepared a basic composition that is widely useful with most of the more than 5000 paints that are being employed in paint spray booths. The basic composition comprises the composition delineated in Table I for preparing 10 gallons of the basic composition such as would be employed in a small circulating system within a paint spray booth.

TABLE I

| Ingredient | Optimum Concentration (Pounds) |
|---|---|
| Water softener-neutralized gluco heptanate, sodium salt | 7.0 |
| Colloid-bentonite clay | 20.0 |
| Surfactant-sodium ligno-sulfonate | 4.5 |
| Alkaline material-alkali metal metasilicate | 27.0 |
| Water | Remainder to fill ten gallons |

This basic composition and respective proportions, or concentrations, has been employed in systems and circulated for long time intervals of from 1 to 3 months to remove paints that do not cause problems with foaming.

EXAMPLE II

In this example, the above basic formulation was employed. In addition, there was added a silicone defoamer obtained from Dow-Corning. The amount of the defoamer was 1 percent by volume added for each of the ten gallon portions of ingredients. Expressed otherwise, 0.1 gallon of defoamer was added for each 10 gallons of basic composition.

The resulting composition did not foam even with paints that caused foaming problems with the basic solution.

EXAMPLE III

In this example, there was added to the basic composition of Example I a solubilizing, emulsifying and dispersing composition formed by a second aqueous solution. The second aqueous solution was prepared in commercial form by admixing a 55 gallon barrel or drum containing 430 pounds of the solubilizing, emulsifying and dispersing composition. Table II delineates the optimum concentration of the respective ingredients in this drum of material.

TABLE II

| Ingredients | Optimum Concentration Pounds |
|---|---|
| Pine oil | 43.0 |
| Heavy aromatic naphtha | 200.0 |
| Butylcellosolve | 30.0 |
| Tall oil fatty acid | 66.0 |
| Nonionic surfactant-octyl phenol with about 10 mols of ethylene oxide per mol of octyl phenol | 30.0 |
| Potash | 16.0 |
| Sodium phosphate | 0.4 |
| Water | 44.5 |

The second aqueous solution was admixed with about equal proportions of the basic composition to form a total composition. This total composition has been employed over long periods of time even with troublesome paints such as the acrylics, alkyds and synthetics in the same manner as described hereinbefore with respect to the basic composition with basic paints. It can be circulated over long time intervals of from one to three months without requiring the troublesome short period treatments of the prior art.

From the foregoing, it can be seen that this invention provides a composition, either in the basic form or in the specialty additive compositions, for trapping and removing any of the more than 5000 commercially available paints from a paint spray booth in which the paints are being employed. The composition of this invention accomplishes all of the objects delineated hereinbefore. Specifically, this composition is also effective when used in conjunction with the electrostatic spray painting, precipitating the paint particles on contact with the water and chemicals in the composition. Constant recirculation and chemical contact gradually break down the paint converting it into a soft sludge that usually settles when the equipment is idle. The composition of this invention has been found effective for use with all types of conventional circulating equipment such as the pump type, the so-called "pumpless" type, and others.

Moreover, the basic composition of this invention has been considered to be relatively safe for flushing into sewer systems and local permission has been granted to flush it into the sewer system. It is frequently desired to recover the valuable constituents of the paint ingredients. Where this occurs, the material is rendered even less troublesome in a sewage system.

The following specific advantages have been experienced when employing the composition of this invention and are useful in meeting standards under the OSHA, or the National Safety and Health Act, and engineering considerations.

1. It is economical and a single solution charge will last from one to three months.
2. It is easy to use and can be employed in premeasured quantities with no troublesome disolving of dry constituents.
3. The respective solutions work on most or all paints, depending upon the total composition.
4. The composition can help with the stripping of some paints.
5. There are no odor problems when using the composition of this invention.
6. The composition is easily removed and flushed from the system. The booth may be cleaned when agitating and pumping the entire contents from the tank followed by hosing down the sides and the bottom of the system and draining through the draw off point. The paint sludge is liquified which makes for easy removal and no shovels, scrapers or other such equipment are usually required to clean the system.
7. There is low foaming.
8. It is safe on iron, steel and copper metals.
9. It deactivates and disintegrates the paints.
10. It prevents coating of equipment.
11. It contains an inhibitor to reduce corrosion on metallic components.
12. The basic composition can be made effective on epoxies, urethanes and other catalyzed coatings, as well as other troublesome paints.
13. The system can be made effective with water-based paints, such as the alkyds.

Having thus described the invention, it will be understood that such description has been given by way of illustration example and not by way of limitation, reference for the latter purpose being had to the appended claims.

What is claimed is:

1. A method of removing paint from the air in a paint spray booth, comprising the steps of:
   a. forming in a contacting system a dilute aqueous solution-suspension consisting essentially of water containing at least 2.5 percent by volume of a concentrated solution-suspension that includes:
      i. at least 4.0 percent by weight of a water softener selected from the class consisting of a neutralized gluco heptonate salt and neutralized ethylenediaminetetraacetic acid salt;
      ii. a concentration within the range of 4.0–25.0 percent by weight of a colloidal material that will pick up moisture and swell and remain stable in highly alkaline environments; said colloidal material being selected from the class consisting of glue, starch, Kiesulguhr, dextrin, casein and clay;
      iii. a concentration within the range of 1–8 percent by weight of a synthetic surfactant; and
      iv. a concentration within the range of 5–50 percent by weight of an alkaline material selected from the class consisting of an alkali metal hydroxide and an alkali metal metasilicate; said concentration of said alkaline material being sufficient to impart a pH above 10;
   b. contacting at least a portion of the air in the paint spray booth with said dilute aqueous solution-suspension when painting is being done in said paint spray booth so as to strip the paint from the air being contacted with said aqueous solution-suspension; continuing said contacting when painting is being done over a predetermined interval of time of at least one month without adding additional concentrated solution-suspension;
   c. after said predetermined time interval, removing said dilute aqueous solution-suspension and accumulated paint and paint components from said system in a batch type operation and repeating step a. for trouble-free batch type operation that requires very little supervision.

2. The method of claim 1 wherein said time interval is about one to three months of trouble-free batch type operation.

3. The method of claim 1 wherein said concentrated aqueous solution-suspension includes about six percent by weight of said water softener; about seventeen percent by weight of said colloid; about five percent by weight of said synthetic surfactant; about thirty percent by weight of said alkaline material and about one percent by volume of a defoamer.

4. The method of claim 1 wherein said water softener comprises neutralized gluco heptonate salt so as to be stable in the highly alkaline environment and also sequester ions and inhibit rust; said colloidal material comprises clay; said surfactant is a non-ronic surfactant; and said alkaline material comprises sodium metasilicate.

5. The method of claim 4 wherein said non-ionic surfactant is sodium lignosulfonate and said sodium lignosulfonate is in a concentration within the range of 4–5 percent by weight.

6. The method of claim 1 wherein said concentrated solution-suspension also includes a concentration within the range of 0.1–3 percent by volume of a defoamer.

7. The method of claim 1 wherein said concentrated solution-suspension consists essentially of:
   a. about six percent by weight of neutralized gluco heptonate salt so as to be stable in a highly alkaline environment and also sequester ions and inhibit rust;
   b. about seventeen percent by weight of clay;
   c. about four-five percent by weight of sodium lignosulfonate; and
   d. a concentration within the range of 5-50 percent by weight of an admixture of alkali metal hydroxide and an alkali metal metasilicate; said concentration of said admixture being sufficient to impart a pH above 10.

8. The method of claim 7 wherein said concentrated aqueous solution-suspension also includes a concentration within the range of 0.1-3 percent by volume of a defoamer.

* * * * *